Dec. 14, 1965   R. R. WEBSTER   3,222,979
NON-CONTACTING DIMENSIONAL GAGING OF OBJECTS WITH
AN ELECTRON-OPTICS DEVICE
Filed Feb. 9, 1962   2 Sheets-Sheet 1

INVENTOR
Richard R. Webster

BY *[signature]*
ATTORNEY

Dec. 14, 1965        R. R. WEBSTER        3,222,979
NON-CONTACTING DIMENSIONAL GAGING OF OBJECTS WITH
AN ELECTRON-OPTICS DEVICE
Filed Feb. 9, 1962                2 Sheets-Sheet 2
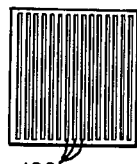
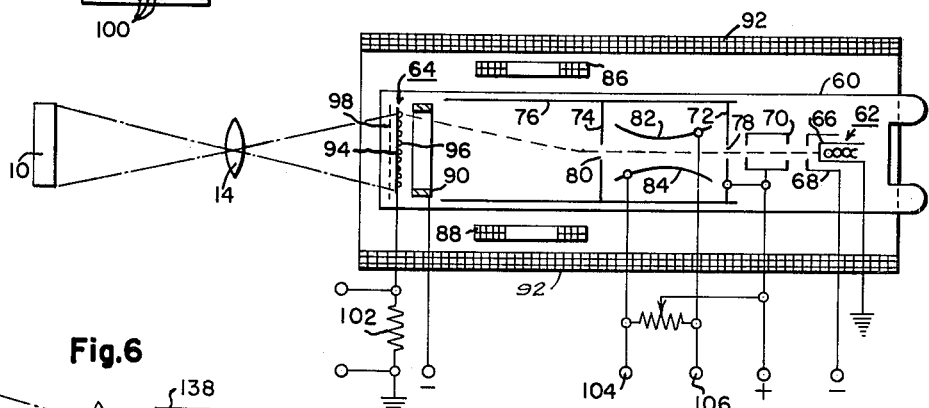
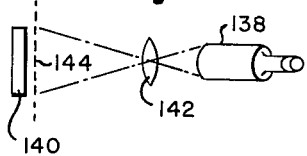
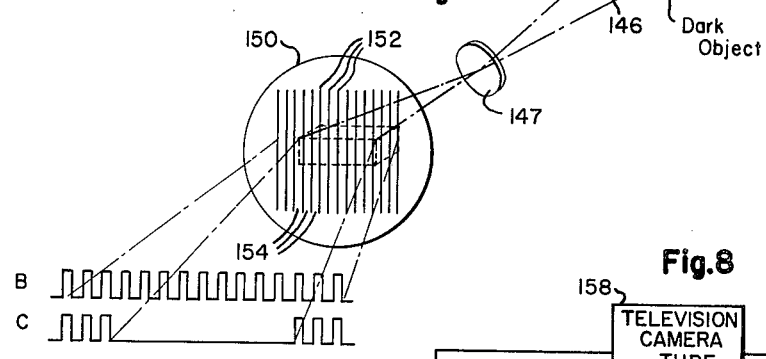
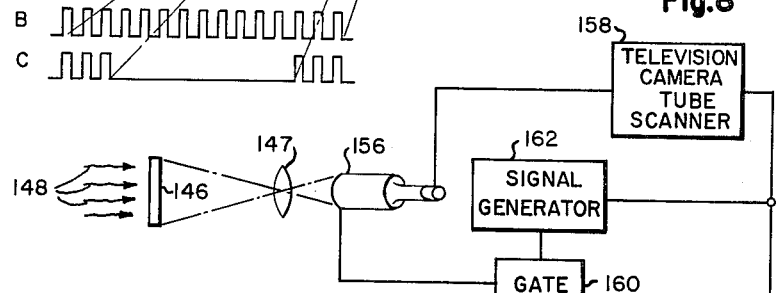
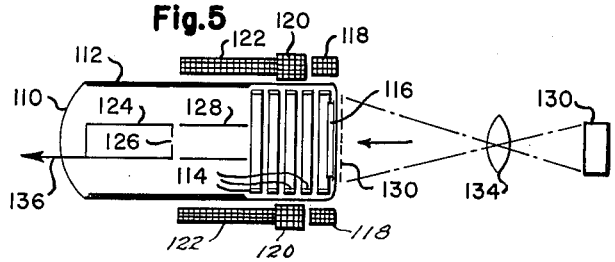
INVENTOR
Richard R. Webster
BY
ATTORNEY

United States Patent Office 3,222,979
Patented Dec. 14, 1965

3,222,979
NON-CONTACTING DIMENSIONAL GAGING OF OBJECTS WITH AN ELECTRON-OPTICS DEVICE
Richard R. Webster, Bethel Park, Pa., assignor to Jones & Laughlin Steel Corporation, Pittsburgh, Pa., a corporation of Pennsylvania
Filed Feb. 9, 1962, Ser. No. 172,270
22 Claims. (Cl. 88—14)

This invention relates to width gages and more particularly to noncontacting measuring apparatus employing an electron-optics device as a detecting element.

Although not limited thereto, the present invention is particularly adapted for use in measuring the width of hot steel slabs and the like where a noncontacting device must be employed due to the high temperature of the object being measured. Such noncontacting measuring systems have been proposed in the past which employ an electron-optics device. Such a system is described, for example, in U.S. Patent No. 2,674,915, Anderson, issued April 13, 1954, where the electron beam of an iconoscope scans the image of an irradiant object. Since the object appears brighter than the background surrounding it, the output of the iconoscope for each scanning cycle is a pulse having a width proportional to the width of the object being scanned. This pulse is then used to gate an oscillator, and the gated output of the oscillator is fed to a counter. Since the number of oscillations passing through the gate during each pulse duration is a function of pulse width, and since the pulse width is, in turn, a function of the width of the irradiant object, the number of oscillations counted by the counter will be an indication of the width of the object.

Although width gages of the type described above may be suitable in certain cases where accuracy is unimportant, they are usually ineffective due to the problems inherent in stabilizing and linearizing the electron-optics system. As is known, a sawtooth wave is employed to sweep the electron beam across the photosensitive target of an iconoscope or other electron-optics device, but since the sawtooth wave itself is not truly linear, the width of the pulse at the output of the device is not an accurate indication of the width of the object. Furthermore, since the voltages employed to sweep the electron beam across the target may vary, further errors may be introduced into the system.

The present invention has as its primary object the provision of a new and improved noncontacting width gage.

More specifically, an object of the invention resides in the provision of noncontacting width measuring apparatus employing an electron-optics device, but in which the problems of linearizing and stabilizing the electron-optics system are eliminated.

Another object of the invention is to provide apparatus of the type described which may be used to gage non-luminous as well as luminous objects. That is, the invention is usable in measuring the width or other dimension of objects which appear darker than the background surrounding them as well as those which appear brighter than that background.

As will become apparent from the following description, the invention employs a television camera tube having a photosensitive surface, and means for converting the electrical image or pattern produced on that surface into a video signal. The camera tube may comprise a vidicon, an image dissector, an image orthicon, or any other suitable electron-optics device, and in one illustrative embodiment of the invention, fine parallel lines of equal spacing are scribed on the focal plane of the camera tube in such a way as to divide its photosensitive surface into a series of elongated parallel and discrete sections which extend substantially perpendicular to the dimension to be measured. Consequently, in the case of an irradiant slab or other bright object, such object will activate the parallel sections disposed between the edges of its image on the photosensitive surface; and the video output signal of the tube will comprise a series of pulses, with the number of pulses corresponding to the number of illuminated sections on the photosensitive surface. If the number of pulses per scan is counted, the result is a value proportional to the length of the slab or other object. In contrast to noncontatcting measuring systems heretofore used, the precision of the device of the present invention is limited only by the optical distortion of the objective lens, the number and precision of spacing of the scribed lines on the photosensitive surface, and the resolution of the scanner.

In another illustrative embodiment of the invention, instead of scribing lines directly on the photosensitive surface of the camera tube, a photographic grating of the Ronchi type, for example, may be placed over the face of the tube to produce alternate illuminated and non-illuminated lines between the edges of the image of the object being measured. These illuminated lines will, in turn, produce pulses in the video output of the tube. Still another possibility is to place a grating adjacent the object being measured rather than on the face of the camera tube.

In accordance with still another aspect of the invention, non-luminous objects can be gaged by presenting them on a luminous background. In this case, a predetermined number of pulses will be produced in the video output of the tube when no dark or non-luminous object lies in the background. When, however, a dark object is placed in the background, the number of pulses in the video output will be decreased in an amount proportional to the dimension of the object being measured. By electrically subtracting this latter number of pulses from those produced by the background alone, a value is derived which varies as a function of the dimension of the object being measured.

The above and other objects and features of the invention will become apparent from the following detailed description taken in connection with the accompanying drawings which form a part of this specification, and in which:

FIG. 3 illustrates another type of electron-optics device which may be alternatively used in accordance with the invention;

FIG. 4 is an illustration of a photographic grating of the Ronchi type which may be used to divide the photosensitive electron target of the camera tube of the invention into a plurality of parallel illuminated sections;

FIG. 5 is a schematic illustration of an image-dissector camera tube which may be used as the electron-optics device in the invention;

FIG. 6 is an illustration of still another embodiment of the invention wherein a marking grid is placed close to the surface of the object being measured rather than on the focal plane of the camera tube;

FIG. 7 is a schematic illustration of the use of the invention for gaging non-luminous objects by presenting them on a luminous background; and FIG. 8 is a schematic block diagram of a circuit arrangement for effecting the gaging method of FIG. 7.

Figure 1:
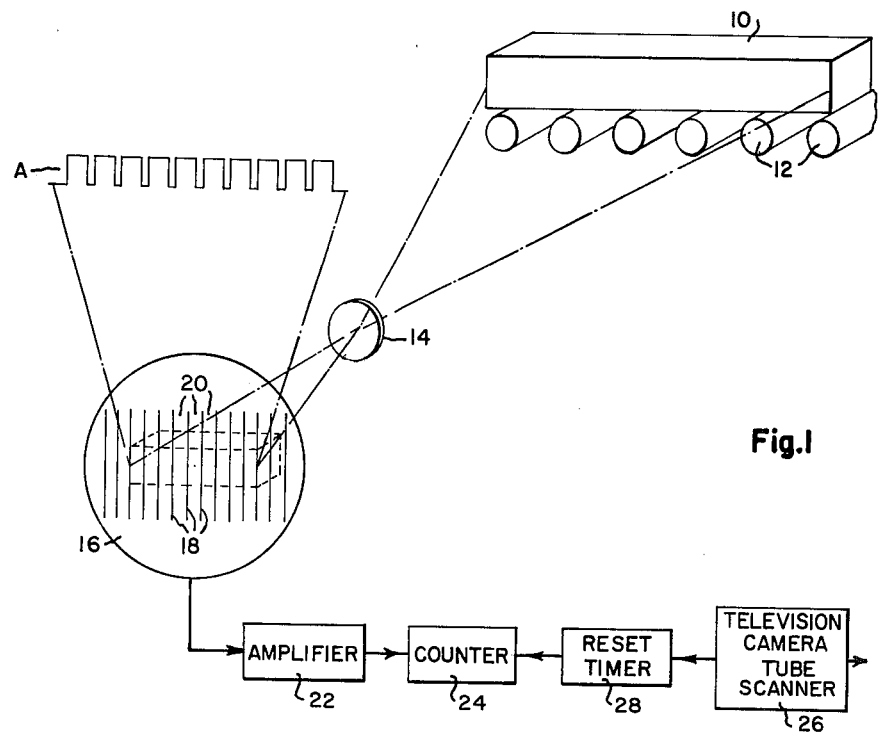
FIGURE 1 is a schematic illustration of the overall operation of one embodiment of the invention.

Referring to FIG. 1, an irradiant hot steel slab 10 is shown which travels along a conveyor, generally indicated at 12. Since the slab 10 is irradiant, it glows or gives off light, meaning that it appears brighter than the background surrounding it. Although the hot slab 10 is shown herein for purposes of illustration, it is to be understood that if the body being measured is not irradiant, it may be illuminated by external means to appear brighter than the background surrounding it in order that the electron beam of a camera tube, hereinafter described, will sense a change in intensity between its edges.

The image of slab 10 is focused by means of lens 14 onto the photosensitive electron target 16 of an electron-optics device. The electron-optics device may comprise a camera tube having a photoconductive surface such as a vidicon, or it may have a photoemissive electron target such as an image dissector or an image orthicon. For that matter, any type of camera tube may be employed having a photosensitive surface which will convert light energy into electrical energy.

In accordance with the present invention, the electron target 16 has a plurality of lines 18 scribed thereon to divide the face of the target into a series of parallel discrete sections 20. As shown, the sections 20 extend substantially perpendicular to the long transverse dimension of slab 10 which is to be measured. If, for example, an electron beam scans across the target 16, its output voltage will rise as it scans each section 20 having a portion of the image of slab 10 focused thereon. Between the sections 20, however (i.e., lines 18), the photosensitive material has been removed so that the voltage output from the target will drop at these points. The result is a series of square wave pulses indicated as wave form A which occur between the edges of the slab image on the electron target. As will be understood, the number of pulses occurring between the edges of the image is dependent upon the slab width, with the number increasing as the width increases. The wave form A is thereafter fed through amplifier 22 to counter 24 which will indicate the number of pulses in the wave form and, hence the width of slab 10. The accuracy of the device will, of course, depend upon the spacing of the scribed lines. That is, as the number of lines is increased the unit of measurement is made smaller and the accuracy increased. In actual practice, a greater number of scribed lines will be employed than shown in the drawing which is for illustrative purposes only.

Since the electron beam of the camera tube scans the target 16 continuously, some means must be provided to reset counter 24 after each scan of the electron beam or after a predetermined number of scans of the beam. This may be accomplished by feeding the output of the TV tube scanner or sawtooth wave generator 26 to a reset timer 28 which, in effect, is itself a counter. As is well known, the TV camera tube scanner will produce an output sawtooth wave form during each cycle of the scanning process. These sawtooth wave forms may be counted in timer 28 which will then reset the counter 24 after a predetermined number of scanning cycles. Thus, if the counter is to be reset after ten scanning cycles, the timer 28 would produce an output to reset counter 24 in response to ten sawtooth wave forms from circuit 26. The counter can then be calibrated to convert the number of pulses which it has counted over the ten cycle span into the width of the slab in feet or inches. For that matter, the counter 24 could be reset after each scanning cycle or it could be reset after any given number of scanning cycles just so long as the device is calibrated to give an indication of the width of the slab 10.

Figure 2:
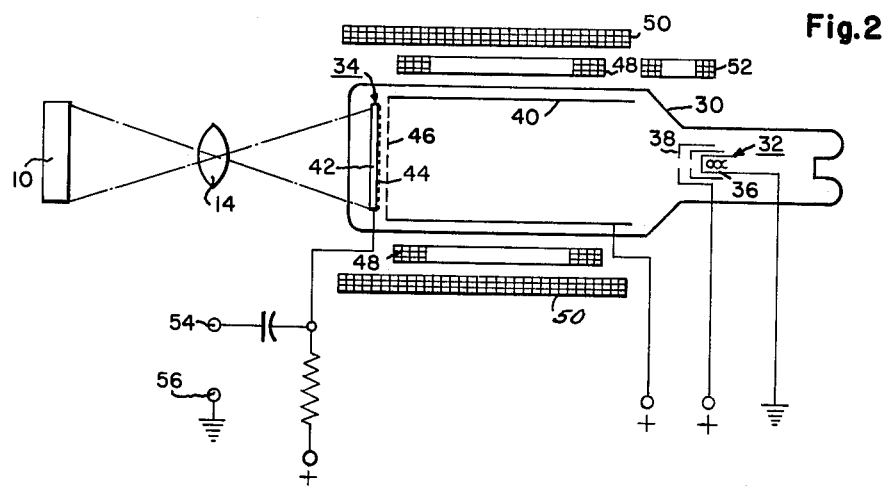
FIG. 2 is an illustration of a vidicon camera tube which may be used as the electron-optics device in the invention.

FIG. 2 illustrates a vidicon tube which may be employed in the present invention. The tube consists of an evacuated glass cylinder 30 containing an electron gun 32 at one end and a photoconductive target 34 at the other end. The electron gun 32 consists of an indirectly heated cathode 36, a control grid 38, and a wall anode 40. The target 34 is a transparent signal plate 42 coated on one side with photoconductive material 44. The photoconductive surface 44 is, of course, scribed to divide it into the plurality of parallel spaced sections identified by the numerals 20 in FIG. 1. The wall anode 40 extends for most of the length of the tube and is connected to a screen 46 situated near the target. Line deflection coils 48 are grouped around the tube and are surrounded by a focusing coil 50 which produces an axial magnetic field for the electron beam. A small alignment coil 52 is situated opposite the exit end of the electron gun 32.

In operation, the signal plate 42 is biased positive with respect to the cathode 36, and the scanned side of the target is stabilized near cathode potential by the electron beam. Thus, a considerable electric field is established between opposite faces of the target. As a result of this field, current flows between the opposite faces of the target at the point where the scanning beam strikes the target. The magnitude of the current depends upon the signal plate bias and the conductivity of the target, the latter depending, in turn, on the light incident on the target. The sawtooth wave output of TV camera tube scanner 26 is applied to deflection coils 48 whereby the electron beam will be caused to scan across the photoconductive material 44 in a direction perpendicular of the parallel sections 20. As the electron beam strikes each of the conductive sections 20 it will produce an output pulse, assuming that that particular section is illuminated by the image of slab 10. These output pulses will then appear across terminals 54 and 56 and are applied to the amplifier 22 shown in FIG. 1.

The invention may also be employed with a photoemissive camera tube such as that shown in FIG. 3. This tube is similar to the vidicon already described and consists of an evacuated cylindrical glass tube 60 having an electron gun 62 at one end and a photoemissive target 64 at the other end. The electron gun is provided with an indirectly heated cathode 66, a control grid 68 and an anode 70. To the anode are connected two apertured electrodes or diaphragms 72 and 74 as well as a wall anode 76 extending for most of the length of the tube. The first diaphragm 72 has a circular hole 78 larger than the required electron beam cross section. The second diaphragm 74 has a slot 80 parallel with the deflector plates (i.e., at right angles to the plane of the drawing). In the space between the two diaphragms 72 and 74 are a pair of deflector plates 82 and 84 between which the electron beam passes, these deflector plates being rotated from 90° from the positions shown in an actual installation. Between the second diaphragm 74 and the target 64 the beam passes through the magnetic field of two coils 86 and 88 which are clamped to the outside of the tube. A short cylinder 90 immediately in front of the target 64 is held at a small negative potential, while a large solenoid 92 carrying direct current surrounds the entire tube and produces an axial magnetic field for the electron beam. The target 64 consists of a transparent signal plate 94 having a mosaic on its side facing the electron beam. This mosaic consists of a plurality of minute islands of photoemissive material 96. The mosaic 96 may be scribed as was the target of the vidicon shown in FIG. 2. However, the apparatus is illustrated herein as being a photographic grating of the Ronchi type positioned in front of the target. Such a photographic grating is shown in FIG. 4 and comprises a transparent plate 98 having a plurality of opaque lines 100 on its face. Light will, therefore, pass through the grating only between the lines to produce a series of illuminated lines on the target 64. The sawtooth wave form from circuit 26 is applied to deflector plates 82 and 84 through terminals 104 and 106.

In operation, the scanning beam electrons strike the mosaic 96 and give it a negative potential which increases with time. This potential sets up between the target and the gun anode an electric field, also increasing with time, which slows down approaching beam electrons and decreases the rate of increase of target potential. Eventually, a state of equilibrium is reached in which the retarding field before the target is strong enough to prevent any scanning beam electrons from reaching the target. At this point the target potential is now approximately equal to that of the cathode 66. When the mosaic 96 is in darkness there is no photoemission and the target takes up a minimum potential low enough to repel all the primary electrons and prevent them from striking the target. When light falls upon the mosaic, however, photoelectrons are released from the various elements of the mosaic and these electrons are accelerated to the anode by the electric field between the anode and the target. During scanning of the illuminated mosaic, primary electrons from the electron beam land on the mosaic in sufficient numbers to neutralize the charge and restore the mosaic to its minimum potential. This induces electromotive forces in the signal plate 64 which is capacitively coupled to the mosaic elements, and the output of the tube is developed across the signal resistor 102 connected between the signal plate 64 and the electron gun cathode 66 (i.e., ground). Although the mosaic 96 may be scribed to produce parallel discrete sections as was mentioned above, the apparatus of FIG. 3 is possibly best suited for the Ronchi-type filter. This, in effect, will produce the wave form A in the same manner as the scribed lines since it permits light to strike the electron target only at spaced intervals.

Referring now to FIG. 5, another embodiment of the invention is shown employing an image dissector as an electron-optics device. The image dissector comprises an evacuated glass envelope 110 having an annular anode wall coating 112 at the rearward end thereof. Ahead of the anode wall coating 112 are a series of ring electrodes 114; while ahead of the electrodes 114 is a translucent target or cathode 116 having a photosensitive deposit thereon. Surrounding the glass envelope 110 at the forward end thereof are three coils 118, 120 and 122. Coil 118 acts as a focus coil; coil 120 is a vertical deflection coil; whereas coil 122 is a horizontal deflection coil. Within the glass envelope 110 adjacent the anode wall coating 112 is an electron multiplier 124 having an aperture 126 through which electrodes from the cathode 116 pass. In front of the electron multiplier is an anode shield 128; while in front of the glass envelope 110 adjacent the cathode 116 is a grating 130 of the Ronchi type similar to that shown in FIG. 4. The image of an irradiant or otherwise luminous body 130 is focused onto the cathode 116 by means of the usual lens 134.

The image dissector, unlike most electron-optics devices, does not employ an electron beam which sweeps across a photosensitive surface. Rather, the electrical image on the cathode 116 is moved across the aperture 126 such that at any one instant, only the electrons from a single picture element will appear at the aperture.

In the operation of the image-dissector of FIG. 5, the photocathode surface 116 emits electrons in accordance with light intensity, using the principle of the photoelectric cell. The ring electrodes 114 accelerate the movement of light-emitted electrons toward the anode 112, keeping the motion free of distortion. The focus coil 118 brings the electrons to focus in front of the aperture 126 of the electron multiplier 124; while the deflection coils 120 and 122 move the electrons, element by element, in front of the aperture. As the electrons, element by element, come to focus in front of the aperture 126, they are attracted through the aperture by the electron multiplier 124; while the anode 112 acts as a final termination point for those electrons that do not leave via the aperture 126 in the multiplier. The electron multiplier 124 amplifies the electron signals that enter the aperture, and the amplified signal appears on lead 136 as a video signal.

As will be understood, electrons are emitted from the thousands of individual photoelectric elements on the cathode 116 in accordance with light intensity. Thus, electrons in a pattern leave the cathode surface and begin their journey toward the anode—the number of electrons leaving each element being a function of the light intensity striking that element. Electrons leave as a unit from each element on the cathode surface 116, proceeding without interaction toward the anode and being guided in proper order by the ring electrodes 114, which provide acceleration and prevent distortion of the electric field while it is in motion. The focus coil 118 brings the electrons to focus in front of the aperture 126 at the entrance to the electron multiplier 124. However, at any instant, only the electrons from a single picture element, determined by the size of the aperture 126, will appear at that aperture, the scanning motion being provided by the horizontal and vertical deflection coils 122 and 120, respectively. That is, the deflection coils move the electron pattern from cathode 116, element by element, in front of the aperture 126. Thereafter, the electrons passing through the aperture are amplified in the electron multiplier many times to produce a resultant video signal on lead 136. Instead of providing a Ronchi-type filter or grating 130 in front of the glass envelope, it will be understood that the cathode 116 could also be scribed as in the embodiment of FIG. 2 with the same overall effect.

Referring now to FIG. 6, an electron-optics device 138 is shown which may comprise any suitable instrument for converting an optical image into a video signal. The image of the object 140 being measured is, like the other embodiments, focused on the photosensitive surface of the electron-optics device 138 by means of a lens 142. In this case, however, instead of providing a filter or grating at the face of the electron-optics device or otherwise scribing the photosensitive surface of the electron-optics device, the grating 144 is provided adjacent the object 140 being measured; and if it is assumed that this object is luminous, alternate bright and dark areas will be produced on the photosensitive surface of the electron-optics device to produce output pulses with the number of pulses being proportional to the width of the object 144 being measured.

In all of the embodiments of the invention heretofore described, it was assumed that the object being measured was luminous, meaning that it appeared brighter than the background surrounding it such as, for example, an irradiant hot steel slab. In FIG. 7, an arrangement is shown for measuring the width or other dimension of a non-luminous object. In this case, the object 146 will appear dark; whereas the background surrounding it will appear brighter as indicated by the light rays 148 in FIG. 7. The image of the object 146 is focused by lens 147 onto the photosensitive surface 150 of an electron-optics device which may comprise a camera tube having a photoconductive surface such as a vidicon, or a photoemissive electron target such as an image dissector or an image orthicon. As in other embodiments of the invention heretofore described, the photosensitive surface 150 has a plurality of lines 152 scribed thereon to divide the face of the target into a series of parallel discrete sections 154, these sections extending substantially perpendicular to the long transverse dimension of the object 146 which is to be measured. Alternatively, the scribed lines 152 may be omitted and a grating or filter of the Ronchi type employed as in other embodiments of the invention, this filter being either adjacent the photosensitive surface 150 or adjacent the object 146.

If no object is present in the light background, the output of the electron-optics device will appear as wave form B wherein pulses are produced across the entire width of the photosensitive surface. If, however, the object 146 is placed in the field of view of the lens 147, pulses will not appear between the edges of the image of the object on the photosensitive surface as illustrated by wave form C in FIG. 7. Thereafter, by electrically subtracting the pulses in wave form C from those in wave form B, a number of pulses will be derived which vary as a function of the width of the object 146 being measured.

One type of electrical circuitry for effecting the foregoing is shown in FIG. 8 wherein the electron-optics device is identified by the numeral 156. The electrical image on the photosensitive surface of the electron-optics device is periodically scanned by means of either an electron beam or by the arrangement shown in FIG. 5 for the image dissector, the scanning signal being derived from circuit 158. The video output signal from the electron-optics device is applied to a gate circuit 160; and for purposes of the present description it will be assumed that the gate circuit 160 incorporates means for inverting the wave form C shown in FIG. 7. The camera tube scanner circuit 158 also triggers a signal generator 162 which produces an output signal corresponding to wave form B in FIG. 7 during each scanning cycle. Thereafter, by gating the wave form B in gate circuit 160 with the inverted wave form C, an output signal will be fed to a counter 164 comprising a series of pulses which persist between the edges of the object 146. The output of the counter 164 on lead 165 will then be an indication of the dimension of the object being measured. As in the embodiment of the invention shown in FIG. 1, means are provided to reset counter 164 after each scan cycle of the electron-optics device 156 or after a predetermined number of scan cycles. This is accomplished, as in the embodiment of FIG. 1, by feeding the output of the camera tube scanner 158 to a reset timer 166 which is also a counter. Since the camera tube scanner 158 will produce an output sawtooth wave form during each cycle of the scanning process, these sawtooth wave forms may be counted in reset timer 166 which will then reset the counter 164 after a predetermined number of scanning cycles. The counter 164 can then be calibrated to convert the number of pulses which have been counted for a predetermined number of scan cycles into the width of the object in feet or inches.

The invention thus provides noncontacting apparatus for measuring the width of a luminous or non-luminous object whereby the problems inherent in stabilizing and linearizing a television camera tube are eliminated. Although the invention has been shown in connection with certain specific embodiments, it will be readily apparent to those skilled in the art that various changes in form and arrangement of parts may be made to suit requirements without departing from the spirit and scope of the invention.

I claim as my invention:

1. Apparatus for measuring the edge to edge dimension of an article having a substantially uniform light intensity which is different than the background surrounding the article comprising, in combination, an electron-optics device having a photosensitive surface therein, means for focusing an image of said article on the photosensitive surface, means in the electron-optics device for converting the electrical image produced on the photosensitive surface into a video output signal representing that image, and means for dividing the photosensitive surface into areas of different photosensitivity between the edges of said image when the image is focused thereon whereby a series of pulses will be produced in the video output of the electron-optics device with the number of pulses being a function of the distance between said edges of the image.

2. The apparatus of claim 1 wherein the areas of different photosensitivity are of equal width between the edges of said image and wherein the means for converting the electrical image on the photosensitive surface into a video signal is such that periodic groups of pulses will be produced in the video signal with the number of pulses in each group being a function of the distance between said edges of the image.

3. Apparatus for measuring the edge to edge dimension of an article having a substantially uniform light intensity which is different than the background surrounding the article comprising, in combination, an electron-optics device having a photosensitive surface therein, means for focusing an image of said article on the photosensitive surface, means in the electron-optics device for converting the electrical image produced on the photosensitive surface into a video output signal representing that image, means for dividing the photosensitive surface into areas of different photosensitivity between the edges of the image when the image is focused thereon whereby a series of pulses will be produced in the video output of the electron-optics device with the number of pulses being a function of the distance between said edges of the image, and means for counting the pulses in said video output signal to obtain an indication of the distance between said edges of the image.

4. Apparatus for measuring the edge to edge dimension of an article having a substantially uniform light intensity which is different than the background surrounding the article comprising, in combination, an electron-optics device having a photosensitive surface therein, said surface being divided into discrete separated sections, means for focusing an image of said article on the photosensitive surface such that the distance between the edges of the article to be measured will extend perpendicular to said discrete separated sections, and means in the electron-optics device for converting the electrical image produced on the photosensitive surface into a video output signal comprising a series of pulses with the number of pulses being a function of the distance between said edges of the image.

5. Apparatus for measuring the edge to edge dimension of an article having a substantially uniform light intensity which is different than the background surrounding the article comprising, in combination, an electron-optics device having a photosensitive surface therein, means for focusing an image of said article on the photosensitive surface, a grating interposed between said article and the photosensitive surface for dividing the image of the article on said surface into a series of light and dark areas along said edge to edge dimension, and means in the electron-optics device for converting the electrical image produced on the photosensitive surface into a video output signal comprising a series of pulses with the number of pulses being a function of the distance between said edges of the image.

6. The apparatus of claim 5 wherein the grating is closely adjacent said photosensitive surface.

7. The apparatus of claim 5 wherein the grating is closely adjacent said article.

8. Apparatus for measuring the edge to edge dimension of an article having a substantially uniform light intensity which is different than the background surrounding the article comprising, in combination, an electron-optics device having a photosensitive electron target therein, means for focusing an image of said article on the electron target, means in the electron-optics device for sweeping an electron beam across the electron target from one edge of the image to the other, and means for dividing the electron target into areas of different photosensitivity between the edges of said image when the image is focused thereon whereby a series of pulses will be produced at the output of the electron-optics device as the electron beam scans from one edge of the image to the other.

9. Apparatus for measuring the edge to edge dimension of an article which has a different light intensity than the background surrounding it comprising, in combination, an electron-optics device having means including a photosensitive electron target which will produce a pulsed output signal when an image of said article is focused thereon while an electron beam is swept across the target from one edge of the image to the other, and a counter electrically coupled to said target for indicating the number of pulses produced by the electron beam as it sweeps across the target.

10. Apparatus for measuring the edge to edge dimension of an article which has a different light intensity than the background surrounding it comprising, in combination, an electron-optics device having a photosensitive electron target divided into substantially parallel discrete sections of equal width and spacing, means for sweeping an electron beam across successive ones of said discrete sections while the image of said article is focused thereon, and a counter electrically coupled to said sections for indicating the number of electrical pulses produced by the electron beam as it sweeps across the sections of the electron target, the arrangement being such that successive pulses will be produced by each of said sections having at least a portion of the image of said article impinged thereon.

11. Apparatus for measuring the edge to edge dimension of an article which has a different light intensity than the background surrounding it comprising, in combination, an electron-optics device having a photosensitive electron target divided into substantially parallel discrete sections, means for sweeping an electron beam across successive ones of said discrete sections while the image of said article is focused thereon with the dimension to be measured extending substantially perpendicular to said parallel sections, and a counter electrically coupled to said sections for indicating the number of pulses produced by the electron beam as it sweeps across the sections of the electron target.

12. Apparatus for measuring the edge to edge dimension of an article which has a different light intensity than the background surrounding it comprising, in combination, an electron-optics device having a photosensitive electron target divided into discrete separated sections, means for sweeping an electron beam across successive ones of said discrete sections while the image of said article is focused thereon with the discrete sections being disposed between the images of the edges of the dimension to be measured, and a counter electrically coupled to said sections for indicating the number of electrical pulses produced by the electron beam as it sweeps across the sections of the electron target between the images of said edges.

13. Apparatus for measuring the edge to edge dimension of an article which appears brighter than the background surrounding it comprising, in combination, an electron-optics device having a photosensitive electron target, means for focusing an image of the article to be measured on said electron target, a grating interposed between said article and the electron target for dividing the image of the article on said target into a series of light and dark areas along its length, means for sweeping an electron beam across the bright and dark areas on the electron target produced by said grating, and a counter electrically coupled to said electron target for indicating the number of electrical pulses produced by the electron beam as it sweeps across the bright and dark areas on the electron target between the edges of said image.

14. Apparatus for measuring the edge to edge dimension of an article having a different light intensity than the background surrounding it comprising, in combination, an electron-optics device having a photoconductive electron target divided into substantially parallel discrete elongated sections, means for sweeping an electron beam across successive ones of said discrete sections while the image of said article is focused thereon with the dimension to be measured extending substantially perpendicular to said parallel sections, and a counter electrically connected to said sections for indicating the number of pulses produced by the electron beam as it sweeps across the sections of the electron target.

15. Apparatus for measuring the edge to edge dimension of an article having a different light intensity than the background surrounding it comprising, in combination, an electron-optics device having a photoemissive electron target divided into discrete separated sections, means for sweeping an electron beam across successive ones of said discrete sections while the image of said article is focused thereon with the discrete sections being disposed between the images of the edges of the dimension to be measured, and a counter electrically coupled to said sections.

16. Apparatus for measuring the edge to edge dimension of an article which has a different light intensity than the background surrounding it comprising, in combination, an electron-optics device having photosensitive electron target means which will produce a pulsed output signal when an image of said article is focused thereon while an electron beam is swept across the target from one edge of the image to the other, means including a sawtooth wave generator connected to said electron-optics device for actuating the electron beam to periodically sweep across the target, a counter electrically coupled to said target for indicating the number of pulses produced by the electron beam as it sweeps across the target, and circuit means responsive to the output of said sawtooth wave generator for resetting the counter after a predetermined number of sweeps across the electron target by said electron beam.

17. Apparatus for measuring the edge to edge dimension of an article which has a different light intensity than the background surrounding it comprising, in combination, an electron-optics device having a photosensitive electron target divided into substantially parallel discrete sections of equal width and spacing, electromagnetic means for sweeping an electron beam across successive ones of said sections while the image of said article is focused thereon with the dimension to be measured extending substantially perpendicular to said parallel sections, a sawtooth wave generator operatively connected to said electromagnetic means for periodically sweeping the electron beam across said sections, a counter electrically coupled to said sections for indicating the number of electrical pulses produced by said electron beam as it sweeps across the sections, and circuit means responsive to the output of said sawtooth wave generator for resetting the counter after a predetermined number of sweeps of the electron beam.

18. The combination claimed in claim 17 in which the electron target is of photoconductive material.

19. The combination claimed in claim 17 in which the electron target is of photoemissive material.

20. Apparatus for measuring the edge to edge dimension of an article which has a different light intensity than the background surrounding it comprising, in combination, an electron-optics device having a photoemissive surface therein, means for focusing an image of said article on the photoemissive surface, an electron multiplier in the electron-optics device, an aperture between the electron multiplier and the photoemissive surface, electromagnetic means for moving the electron pattern produced on said photoemissive surface in front of said aperture element by element such that the electron multiplier will produce a video output signal representing said image, and means for dividing the photoemissive surface into areas of different photoemissivity between the edges of said image when the image is focused thereon whereby a series of pulses will be produced in the video output signal with the number of pulses being a function of the distance between said edges of said image.

21. The apparatus of claim 20 wherein the photoemissive surface is divided into discrete separated sections of different photoemissivity between the edges of said article.

22. The apparatus of claim 20 wherein a grating is interposed between said article and the photoemissive surface for dividing the image of the article on said surface into a series of light and dark areas between said edges of the image.

References Cited by the Examiner

UNITED STATES PATENTS

| | | | |
|---|---|---|---|
| 2,292,641 | 8/1942 | Jones | 88—1 |
| 2,548,590 | 4/1951 | Cook | 88—14 |
| 2,674,915 | 4/1954 | Anderson | 88—14 |
| 2,674,917 | 4/1954 | Summerhayes | 88—14 |
| 2,733,358 | 1/1956 | Carapellotti | 250—237 X |
| 3,035,478 | 5/1962 | Laycak | 88—14 |
| 3,094,623 | 6/1963 | Weiss | 250—83.3 |

JEWELL H. PEDERSEN, *Primary Examiner.*